Nov. 11, 1952
C. W. JOHNSON
2,617,407
HEATER FOR STOCK WATERING TANKS
Filed June 21, 1949
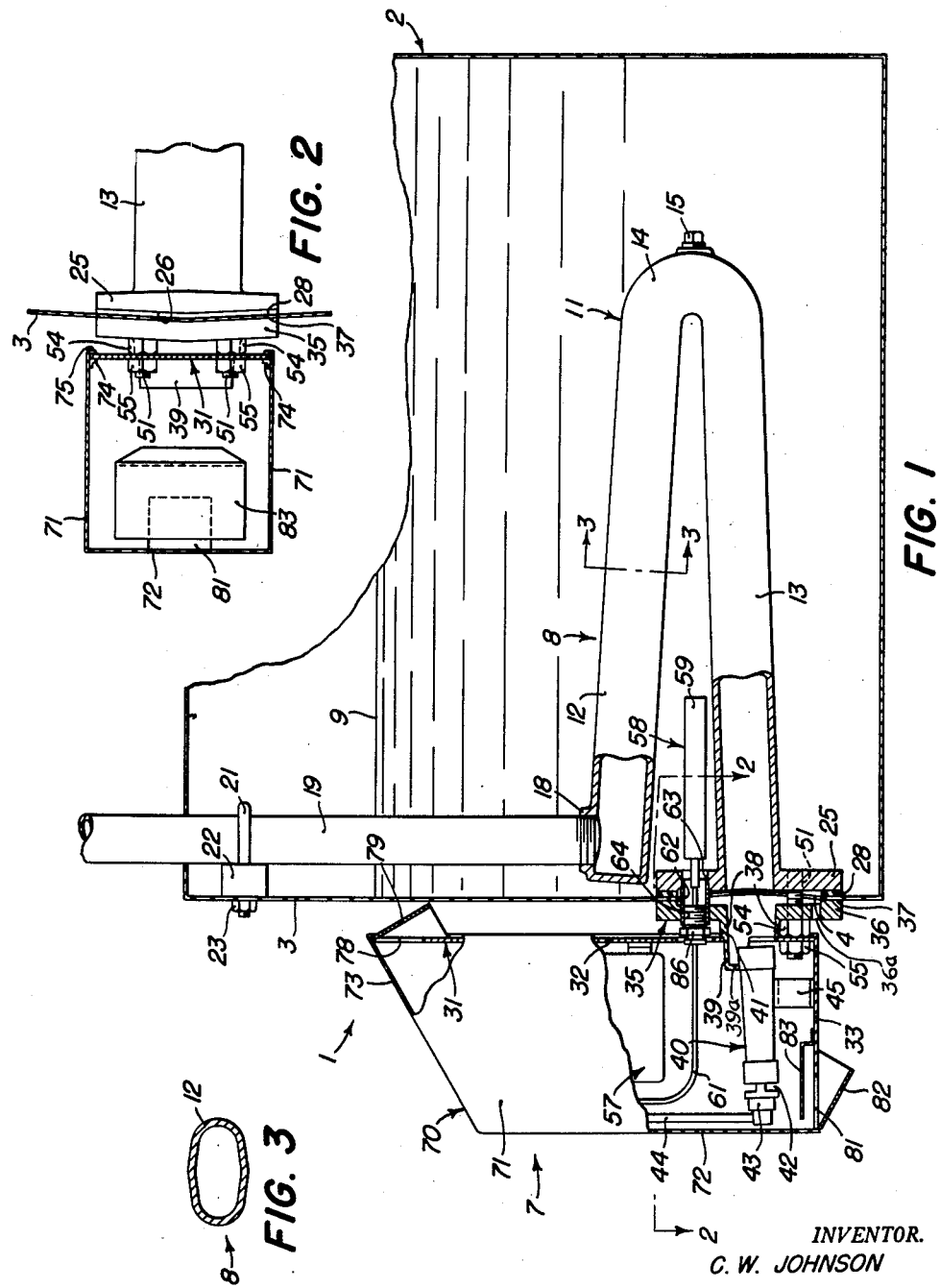
INVENTOR.
C. W. JOHNSON
BY
Merrill M. Blackburn
ATTORNEY Patented Nov. 11, 1952

2,617,407

UNITED STATES PATENT OFFICE 2,617,407

HEATER FOR STOCK WATERING TANKS

Charles W. Johnson, Cedar Rapids, Iowa

Application June 21, 1949, Serial No. 100,389

7 Claims. (Cl. 126—360)

1

The present invention relates, in general, to heating devices, and particularly to heating appliances adapted to heat the water in stock watering tanks to prevent the water from freezing during winter months and to raise the temperature of the water to a point most suitable for consumption of stock.

It is an object of the present invention to provide a heater for stock watering tanks which will maintain the water at a temperature conducive to maximum consumption by the stock.

Another object is to provide a heater for stock watering tanks which will provide constant heat in sufficient quantities to maintain the temperature of the water substantially constant.

A further object of the invention is to provide a heater for a stock watering tank which will not become clogged with frozen condensate.

A further object is to provide a heater for a stock watering tank which may be securely supported above the floor of the tank.

A still further object is to provide a heater for a stock watering tank which will be simple to install.

A still further object is to provide a heater for a stock watering tank, or the like, having the burner outside the tank and the heat exchange unit projecting into the tank so that any condensate precipitating in the heat exchanger is drained from the unit and kept from the burner unit.

A still further object is to provide a heater for a stock watering tank, or the like, which will be more efficient to operate than those now on the market.

Other objects will become apparent upon considering the following specification which, when taken in conjunction with the accompanying drawings illustrates a preferred form of the invention.

In the drawings annexed hereto and forming a part hereof,

Fig. 1 is a side view, with certain parts in section, of a water heater for stock tanks in which the principles of the present invention have been incorporated;

Fig. 2 is a sectional view taken approximately along the plane indicated by the broken line 2—2, Fig. 1; and Fig. 3 is a sectional view taken along the plane indicated by the line 3—3, Fig. 1.

Reference will now be made in greater detail to the annexed drawings for a more complete description of this invention. In Fig. 1, the reference numeral 1 indicates a stock tank water heater, embodying the present invention, installed in a stock watering tank 2 of conventional construction. The tank 2 has a vertical side wall 3 apertured at 4 to receive the heater 1. The water heater 1 comprises a burner unit 7 normally disposed exteriorly of the tank 2. The burner unit 7 delivers burning gases to a heat-exchange unit 8 which is inside the tank submerged in the water to be heated. Conventionally, tanks of this type are provided with suitable means, such as a float control, not shown, for supplying water to the tank, as needed, and for keeping the water level therein at some suitable level, as shown at 9.

The heat-exchange unit 8 on the inside of the tank comprises, in general, a V-shaped tubular element 11 having a substantially oval cross-section, as shown in Fig. 3, with the upper and lower legs 12 and 13 interconnected by a curved section 14. The section 14 is provided with a drain or clean-out port closed by a plug 15. The tubular element 11 is situated in the tank in a generally vertical plane and is arranged so that the upper and lower legs 12 and 13 which are placed in diverging relation with respect to one another, both make a slight angle with respect to a horizontal line, whereby any liquid condensate in the upper leg 12 and associated parts will drain down around the curved portion 14 into the lower leg 13 to the lower end thereof.

The upper end of the upper leg 12 is provided with a tapped boss 18 which receives the lower threaded end of a stack pipe 19. The stack pipe 19 extends upwardly from the boss 18 to a point well above the upper edge of the tank 2. The pipe 19 is fixed to the upper portion of the wall 3 above the water level 9 by means of a U-bolt 21. The U-bolt 21 encircles the pipe 19 and extends through a spacer or filler block 22 and through the wall 3 to secure the stack pipe 19 to the tank 2, and to form a supplemental support for the heat exchange unit.

The lower end of the lower leg 13 is provided with a flange 25 which is disposed in a plane lying at a slight angle to the longitudinal axis of the lower leg 13, the angle being such, as best shown in Fig. 1, that when the flange is fixed to the wall 3 of the tank, the heat-exchange element 11 is held in proper position in the tank, that is, with the upper and lower legs making equal but opposite angles with respect to a horizontal line. The outer face 26 of the flange 25 is adapted to lie against the inner face of the wall 3 with a sealing gasket 28 therebetween. With the parts arranged in this manner, the gaskets substantially fill the spaces between the flanges of the wall and the tank, and condensate which may form drops into the space between the flanges 25 and 36, and from this runs out through the hole 36a. The outer face 26, as shown in Fig. 2, of the flanged portion 25 is not flat but is formed on two planes lying at a slight angle so as to fit against either a curved tank wall or a flat tank wall. If the tank wall is flat, the tightening of the flange 25 thereagainst produces a slight bend, as shown in Fig. 2. The gasket 28 is of such flexibility and of such other characteristics as to readily accommodate either form of tank.

The burner unit 7 comprises a supporting panel 31 having a back panel section 32 and a lower or base section 33. The panel 31 is carried on a flange plate 35 having a flange 36 with a forward face 37 formed complementarily with respect to the flange 25, as best shown in Fig. 2. The central portion of the flange plate 35 is provided with a tubular extension 38 which is of similar crosssection to the leg 13 of the heat exchanger, and when the various parts are in position on the tank 2, is in alignment therewith. The tubular extension 38 has, in its upper half, an outwardly extending hood section 39, which is, in general, semielliptical. This hood section 39 is of slightly smaller cross-section than the tubular extension 38, the juncture forming a shoulder against which the panel 32 is pulled by the tightening of nuts 55. The extension 38 furnishes a continuous bearing for a full three hundred and sixty degree (360°) surface. The hood 39 extends into the compartment 7 and over the Bunsen burner 40 and terminates in a vertical end member 39a which closes the end of the hood 39 and surrounds the upper half of the burner 40. The hood 39—39a thus forms a collecting chamber for the hot gases which rise from the burner, and directs such gases as rise from the burner into the lower open end of the heat exchanger 8, from whence they pass through the pipes 12 and 13 and out through the stack pipe 19 to the atmosphere.

A burner 40, which is, per se, of conventional construction, comprises an outer shell, an air inlet 42, and a head 43 to which fuel is delivered by a fuel line 44 from any suitable source within the housing 70. This burner 40 is carried on the base 33 of the supporting panel 32 by a bracket 45, or the like, and the forward part of the burner is under the hood section 39 and in a position to discharge its flame and heated gases of combustion through the tubular section 38 and the tank opening 4, into the lower end of the heat exchange leg 13, from whence the heated gases pass through the unit 11 and out of the stack pipe 19.

The heater of the present invention is mounted on the tank wall by means that connects the two flanges 25 and 36. The flange 25 carries a plurality of threaded studs 51 and the outer flange 36 is apertured to receive the outer end portions of the studs 51. In mounting the heater on a tank, the heat exchange unit 8 is first disposed in place within the tank, the wall 3 of which has been apertured to receive the heater, and the gasket 28 is placed over the studs 51, and the latter inserted through holes in the tank wall. Next, the flanged attaching member 35 is mounted on the studs 51 extending outwardly of the tank wall. Then, nuts 54 are threaded onto the studs 51 and tightened firmly, thereby clamping the associated parts together on opposite sides of the tank wall in watertight relation.

The supporting panel 31 is next mounted on the end of the studs extending beyond the nuts 54 and fixed in place thereon by a second set of nuts 55. The supporting panel 31 also supports suitable controls 57 for the burner 40. Such controls 57 may be of any suitable kind and are represented by the control box 57 with which a thermally responsive unit 58 is connected. This includes a bulb 59 filled with thermally expansive fluid and connected through a capillary tube 61 to the associated part of the controls 57. The thermally responsive means 58 is supported by a suitable bracket (not shown), and a bushing 62 is screwed into a tapped opening 63 in the flange 25 of the lower leg, the bushing being disposed in registering holes 63 and 64 formed in the attaching flanges 25 and 36. The bulb 59 of the unit 58 is placed between and protected by the upper and lower legs 12 and 13, as best shown in Fig. 1. If there is any occasion to remove the thermostatic tube or bulb 59, it is possible to screw the nut 64 out of the opening in the sleeve 62 and replace it with a plug, not shown. This may be necessary if the thermostat gets out of order or if it be desirable to remove it during the summer when it is unnecessary to have heat on.

A housing 70 is carried by the supporting member 31 and comprises an enclosure having side walls 71, a back wall 72, and a top sloping wall 73. The forward edge portions of the side walls 71 carry inwardly spaced apart flanges 74 and 75, which guidingly receive the edges of the supporting panel section 32. The upper central portion of the latter has an upper vent opening 78 over which a downwardly and outwardly extending protecting plate 79 is secured, being thus arranged to prevent rain and the like from entering the housing 70. A similar vent 81 is provided in the base section 33 and is likewise protected by an angled plate 82. An upper baffle plate 83 covers the opening 81 in upwardly spaced relation to the base 33. The plates or baffles 79, 82, and 83 provide for the proper flow of air to the burner 40, which may include a pilot burner, if desired, but will prevent either burner from being extinguished by winds, or the like.

Besides providing ample air to the burner unit 7 to support combustion, the baffles 79, 82 and 83 insure a positive pressure within the burner unit which forces air up through the heat exchange unit forcing the products of combustion from under the hood 39—39a into the heat exchanger. Thus any condensation of moisture from the products of combustion occurs within the heat exchanger and such condensate as does form in the heat exchanger runs down the leg 13 into the aperture between the flanges 25 and 35 and through the aperture 36a in the flange 35 and does not enter the burner unit 7. This construction therefore prevents the accumulation of condensate in the burner unit 7 and keeps it dry at all times.

By removing the outer nuts 55, the supporting panel 31, together with the associated control and other parts, may be readily removed, as for servicing and the like, without affecting the firm connection of the flanged parts to the tank or the mounting of the heat-exchange unit 8 inside the tank. A packing gland 86 seals the passage of the tube 61 through the bushing 62.

The parts are so proportioned and operated that practically all of the heat in the fluids flowing through the heat-exchange unit 8 is extracted before the spent gases pass out of the stack 19. Any condensate that is formed flows down the stack 19, along the upper and lower legs 12 and 13 to the lower end of the leg 13 and out through the hole 36a. As best shown in Fig. 1, the space between the flanges 25 and 36 serves as a trap or chamber into which the condensate flows before running out through the opening 36a. The firm attachment of the upper end of the vent stack 19 to the tank wall effectively protects the main parts of the heater as a result of any blow on the upper end of the stack. Any suitable means may be provided for holding the housing 70 in position on the supporting panel 31, but such connection should be sufficiently sturdy to prevent detachment of the housing by cattle or hogs, in rubbing against the housing. It will be noted that all parts of the heater are placed above the bottom of the tank, whereby cleaning the tank, which may be necessary at intervals is facilitated.

It is of course understood that the specific description of structure set forth above may be departed from without departing from the spirit of this invention as disclosed in this specification and as defined by the appended claims.

Having now described my invention, I claim:

1. In a watering tank for stock including a side wall for said tank having a hole therein, a heater for the water comprising, a V-shaped heat exchange element within said tank, said heat exchange element comprising a continuously upwardly sloping V-shaped tubular member for the passage of hot gases, means securing the lower end of said tubular member to the wall of the tank over said hole, a burner unit supported from said last named means and adapted to discharge heated gases into said heat exchanger, and a thermally responsive element adjacent the exterior of the heat exchanger and located in general between the legs of the V to control the flow of heated gas to the heat exchanger.

2. In a stock water tank, a water heater comprising a constantly upwardly sloping heat exchange element mounted within said tank, a burner unit mounted outside said tank and adapted to discharge heated gases into said heat exchange element, and a hood connected to said heat exchange element having its upper interior surface in a line with the interior of the heat exchange element and covering said burner unit and having its outer end in engagement with said burner unit and adapted to trap heated gases rising from said burner unit and direct the same into said heat exchange element.

3. In a stock water tank having an exterior wall, a stock water heater mounted about an aperture in said wall, said heater comprising, an upwardly sloping heat exchanger mounted on the interior of the tank about said aperture to heat the water in the tank, a housing mounted on the exterior of the tank at the lower end of said heat exchanger, an extension of the heat exchanger extending to said housing, a heating element mounted in said housing and adapted to discharge burning gases into said heat exchanger, a hood mounted above and partially surrounding said heating element with its outer end in contact with the heating element to collect gases rising from the heating element and direct the same into said heat exchanger, and means admitting air freely to said housing to assist in carrying the gases from said hood into said heat exchanger.

4. In a stock water tank having an exterior wall with an aperture cut therethrough, a stock water heater comprising, a heat exchanger comprising a flange adapted to be secured to the wall of the tank about said aperture and a continuously upwardly sloping tubular member, a second flange on the exterior of the tank having a central recess therein and an aperture adapted to drain liquid from said recess, means including said flanges to secure said heater to the tank wall about said aperture, and a housing mounted on the exterior of the tank and spaced from said second flange whereby condensate flows back down said tubular member into said recess and out through the aperture in the second flange without entering the housing.

5. In a stock water tank having an exterior wall with an aperture cut therethrough, a stock water heater comprising, a heat exchanger comprising a flange adapted to be secured to the wall of the tank about said aperture and a continuously upwardly sloping tubular member, a second flange on the exterior of the tank having a central recess therein and an aperture adapted to drain liquid from said recess, means including said flanges to secure said heater to the tank wall about said aperture, a housing mounted on the exterior of the tank and spaced from said second flange, a gas burner in said housing adjacent said heat exchange element and means to collect heated gases from said burner and direct the same into said heat exchanger, whereby condensate from the heated gases flows back down said tubular member into said recess and out through the aperture in the second flange without entering the housing.

6. In a stock water tank having an exterior wall with an aperture cut therethrough, a stock water heater comprising, a heat exchanger comprising a flange adapted to be secured to the wall of the tank about said aperture and a continuously upwardly sloping tubular member, a second flange on the exterior of the tank having a central recess therein and an aperture adapted to drain liquid from said recess, means including said flanges to secure said heater to the tank wall about said aperture, a housing mounted on the exterior of the tank and spaced from said second flange, a gas burner in said housing adjacent said heat exchange element and a hood above and partially surrounding said gas burner to collect heated gases from said burner and direct the same into said heat exchanger, whereby condensate from the heated gases flows back down said tubular member into said recess and through the aperture in the second flange without entering said housing.

7. A water heater for a stock watering tank, comprising an upwardly sloping heat exchange unit mounted within said tank, a housing mounted on the outside of said tank, and spaced therefrom and a burner within said housing discharging products of combustion into said heat exchanger to heat the water, said water heater having an aperture means located at and communicating with the lower end of the heat exchanger between said heat exchanger and said housing adapted to collect and drain moisture collecting in the heat exchanger from the water heater without passing through the housing.

CHARLES W. JOHNSON.

(References on following page)

REFERENCES CITED

The following references are of record in the file of this patent:

UNITED STATES PATENTS

| Number | Name | Date |
|---|---|---|
| 430,717 | Wilks | June 24, 1890 |
| 506,842 | Burke | Oct. 17, 1893 |
| 754,838 | Bates | Mar. 15, 1904 |
| 761,548 | Sheaff | May 31, 1904 |
| 793,472 | Thorbus | June 27, 1905 |
| 818,677 | Flory et al. | Apr. 24, 1906 |
| 922,457 | Christensen | May 25, 1909 |
| 970,095 | McPheeters | Sept. 13, 1910 |
| 1,000,737 | MacLennan | Aug. 15, 1911 |
| 1,066,215 | Murray | July 1, 1913 |
| 1,105,496 | Custis | July 28, 1914 |
| 1,113,185 | Bernhard | Oct. 13, 1914 |
| 1,166,411 | Davis | Dec. 28, 1915 |
| 1,210,585 | Behl | Jan. 2, 1917 |
| 1,356,564 | Shields | Oct. 26, 1920 |
| 1,398,985 | Wadley | Dec. 6, 1921 |
| 1,481,415 | Casper | Jan. 22, 1924 |
| 1,751,533 | Taylor | Mar. 25, 1930 |
| 2,230,076 | Etnyre | Jan. 28, 1941 |
| 2,363,742 | Norton | Nov. 28, 1944 |
| 2,429,360 | Kells | Oct. 21, 1947 |